United States Patent Office 3,232,916
Patented Feb. 1, 1966

3,232,916
CROSS-LINKED MEMBRANES OF POLYVINYL
ALCOHOL
Merlyn W. Fogle, Toledo, Ohio, assignor to Eltra
Corporation, a corporation of New York
No Drawing. Filed Apr. 17, 1962, Ser. No. 188,246
9 Claims. (Cl. 260—91.3)

This invention relates to ion-permeable membranes, more particularly to a membrane fabricated from polyvinyl alcohol which has been insolubilized by a reaction with a multifunctional oxirane compound.

These membranes which in themselves are not electrical conductors, but can absorb appreciable quantities of aqueous solutions of electrolyte, find application in batteries and other devices where electrical currents must be transported by ionic movement, but the conduction of the electrical current by electrons must be prevented. That is, they are insulators towards electron currents but permit the passage of ions in aqueous solutions.

When such membranes find application in storage batteries and electrolytic cells, they usually are referred to as separators. They are ordinarily made from cellulose in some form or are built from one or more inert synthetic fibers or from glass fibers. The usual form is an insulating mat which permits ionic conduction because of the electrolyte solution contained in the interstices between the fibers or as a dissolver electrolyte within films, as for example in films of regenerated cellulose.

When considering polymer films, it immediately becomes apparent that many are not suitable for making separators. For example, polyethylene films are good insulators and have physical properties which are desirable, but such films are hydrophobic, do not absorb electrolye solutions, and if non-porous cannot allow passage of ions. They are not permeable to ions in solution.

To become permeable to ions it appears that a non-porous polymer film must absorb the aqueous electrolyte solution. The phenomenon of absorbing aqueous electrolyte solutions results in increased dimensions and is usually referred to as swelling. The swelling and solubility of polymers in aqueous solutions are related. Many polymers which become highly swollen in water are soluble to some extent.

In reference to regenerated cellulose the swelling and solubility may be ascribed to the presence of alcoholic hydroxyl groups. Such groups hydrate or hold water by a secondary valence force sometimes referred to as hydrogen bonding. The dissolved electrolyte accompanies the water.

This is a general phenomenon exhibited to a varying degree by several polymers. Polymers having few groups capable of hydrating or have ones which do not form stable hydrates are found to be insoluble and to swell only slightly in water. On the other hand, polymers with many strong hydrating groups swell in water and/or are water soluble or dispersable. Polyvinyl alcohol, sulfonated polystyrene, starch and others are examples of this kind. Such polymers might act as separators if they were insoluble in water. They can be made insoluble by crosslinking the polymer chains. For example, by crosslinking sulfonated polystyrene, a resin is formed which swells in water but is not soluble.

Such crosslinked polymers form the basis of many ion exchange resins. Starch and polyvinyl alcohol too can be insolubilized by treatment with proper crosslinking agents. The essential requirement is that the reagent be di- or poly-functional so that one molecule may react with two adjacent polymer chains binding them together. This technique will convert polyvinyl alcohol to a useable, insoluble yet permeable membrane suitable for use in electrolyte cells as described above.

Many reagents have been suggested for insolubilizing polyvinyl alcohol. Among the organic reagents are dialdehydes, dimethylol urea, diisocyanates and various difunctional molecules reactive with the alcoholic hydroxyl groups. While these methods can produce an insoluble polyvinyl alcohol suitable for some purposes, the bonds formed are sensitive to either acids or alkalies thereby reducing the effectiveness of the crosslinking when the polymer is in contact with acids or bases and limiting the applications to use in solutions which are nearly neutral, i.e., have a pH near 7.

Metal salts such as sodium borate, ferric nitrate and others will insolubilize polyvinyl alcohol presumably by complex formation either thru the anion or the cation of the salt. Such bonds, that is, those in most complexes of this nature, are not permanent in strong acid solutions and/or in the strongly alkaline solutions frequently found in electrolytic cells. Furthermore, they introduce foreign ions not desirable in the battery or electrolytic cell.

The essence of this invention is an improved insoluble polyvinyl alcohol film suitable to use in electrolytic cells, including the process for producing these films. By this process the film is formed prior to crosslinking the polymer, and the actual cross-linking bonds in the resin are formed later by a heat curing process. In making these insoluble films the stable ether bond is used for crosslinking the resin. This bond is stable in both acid solutions and alkaline solutions of strengths ordinarily found in batteries and electrolytic cells. The formation of this cross linking bond is by a reaction which does not introduce undesirable ions into the electrolytic cell.

It is therefore a principal object of this invention to provide a film or membrane of polyvinyl alcohol which is suitable for use in electrolytic cells.

It is a further object of this invention to provide a method of forming a film or membrane of polyvinyl alcohol wherein the polymer chains are crosslinked by a heat curing process by a reagent having a di- or poly-functional characteristic to react with molecules in adjacent chains binding the chains together.

It is a further object of this invention to provide a film or membrane of polyvinyl alcohol wherein the adjacent chains of molecules are bound together by crosslinking to insolubilize the resin in aqueous solutions while remaining permeable to ions.

Other objects and advantages of this invention relating to the arrangement, operation and function of the related elements of the structure, to various details of construction, to combinations of parts and to economies of manufacture, will be apparent to those skilled in the art upon consideration of the following description and appended claims.

Such crosslinked bonds are formed in the film or membrane by reaction of polyvinyl alcohol with molecules containing a multiplicity of oxirane oxygen atoms. The oxirane group is sometimes referred to as the epoxide group which includes molecules containing two or more epoxide groups capable of reaction with alcohols. The reaction may be as depicted below.

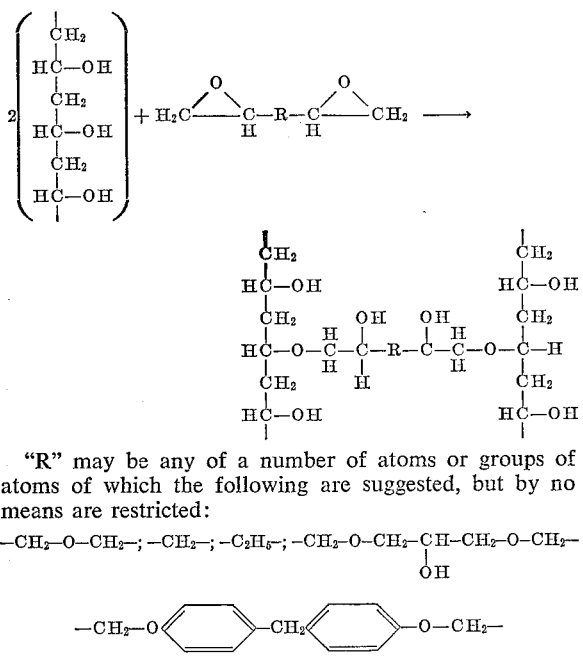

"R" may be any of a number of atoms or groups of atoms of which the following are suggested, but by no means are restricted:

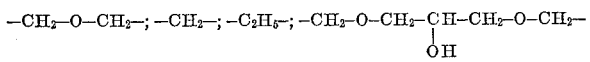

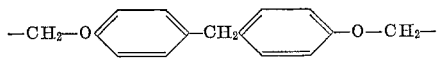

$-CH_2-O-C_2H_4-O-CH_2-$; $-CH_2-O-C_2H_4-O-C_2H_4-O-CH_2-$

A wide variety of multifunctional oxirane compounds may be utilized. Many may be recognized as raw materials for the epoxide resins of commerce.

Of the many polyoxirane compounds the preferred compounds are those which are at least slightly soluble in water. Water solubility, while not an absolute requirement facilitates the production of the films or membrane. Particularly applicable are the reaction products of epichlorohydrin with ethylene glycol or the polyglycols and especially the reaction product of epichlorohydrin and glycerin.

Polyvinyl alcohol may be prepared by hydrolysis or alcoholysis of polyvinyl acetate by methods well known to those skilled in the art. However, it has been found that commercial products may be used, including either completely hydrolyzed or partially hydrolyzed polyvinyl acetate. It must be of proper molecular weight so as to form films of statisfactory strength. Unsaponified polyvinyl acetate cannot be used because free alcoholic hydroxyl groups must be present and available for reaction with the polyoxirane compound.

The preparation of the films is accomplished by dissolving all the ingredients in proper proportions, in a suitable solvent, preferably water. In addition to the polyvinyl alcohol and polyoxirane compound, a catalyst is usually added and, if desired, a plasticizer such as glycerin may be incorporated. The resulting solution is spread evenly over a suitable smooth surface and the solvent evaporated at a low temperature (20–30° C.) to avoid reaction of the oxirane (epoxide) compound with the water present.

When dry, the films may be lifted from the smooth surface and placed in an oven at 160–180° C. for periods of 10–30 minutes to cause the crosslinking reaction. The lower temperatures require longer curing times.

Polyoxirane compounds which are not soluble in water may be used by replacing the water with aqueous alcohol solutions or another water miscible solvent of suitable volatility (boiling point of about 100–110° C. or below). With some solvent systems it may be preferable to use partially hydrolyzed polyvinyl acetate as it is more soluble in non-aqueous solvents than is the completely hydrolyzed polyvinyl alcohol.

In the event partially hydrolyzed polyvinyl alcohol (or acetate) is used, the film must be completely hydrolyzed and washed in water, if it is necessary to avoid the introduction of acetate ions into the electrolytic cell. This can be accomplished by immersion of the crosslinked film in a dilute solution of sodium hydroxide (5–10%) at room temperature for several hours (or at slightly elevated temperatures for shorter periods of time). After hydrolysis, the film is washed free of all ions by several water washes.

While very reactive oxirane compounds may not require a catalyst, it has been found that for complete reaction to produce a water insoluble film within a reasonable time, a catalyst is preferred. It is best to use an acid type of catalyst, or more precisely an acid or "Lewis" acid. Of the compounds which are effective as catalysts, the preferable catalysts were fluoroboric acid and zinc fluoroborate. Although zinc chloride and aluminum chloride and other similar compounds may be used.

Base catalysis, for example, by tertiary amines, is also possible. Bases cause yellowing of the film and may be used if the color is not objectionable.

The time and temperature of curing need not be precisely controlled for a range of permissible conditions were observed. However, these specified conditions appear near optimum and produce a satisfactory product.

The proportion of the ingredients may be varied considerably to obtain desired physical properties. As little as one percent of the crosslinking agent, the diglycidyl ether of glycerin, was sufficient to cause water insolubility. Larger amounts were permissible and 10% was commonly used. All percentages are weight percents based upon the weight of polyvinyl alcohol used.

*Example 1*

Twenty parts of polyvinyl alcohol (completely saponified medium viscosity grade similar to Gelvator 1–60) is added slowly to 200 parts of warm water and stirred until dissolved. When completely dissolved and the solution is homogeneous there is added two parts of the diglycidyl ether of glycerin. One part of a commercial solution of fluoroboric acid (40%) is added and the mixture stirred until homogeneous. Gentle agitation and standing removes air bubbles after which the mixture is spread upon a smooth surface and dried by standing at room temperature to produce the raw film.

When dry, the raw films are removed and cured by hanging in an oven for 10–30 minutes (preferably 20 minutes) at 160–180° C. (preferably 170° C.). After curing, the films are ready for use or may be washed and dried to remove the water soluble catalyst.

*Example 2*

As in Example 1 except that for fluoroboric acid is substituted 1 part of diethylene triamine. Drying and curing resulting in a golden colored water insoluble film.

*Example 3*

The mixture as prepared in Example 1 and 2 is poured over a fiber glass mat placed upon the smooth surface. After drying and curing as in Example 1, an ion permeable water insoluble film is formed which has been reinforced with glass fiber for increased mechanical strength.

*Example 4*

The mixture as prepared in Example 1 is poured over a cellulose fiber mat, similar to chemical filter paper, dried, and cured as in Example 1. An ion-permeable water-insoluble membrane results in which the reinforcing media has been chemically bonded to the crosslinked polymer.

*Example 5*

Twenty parts of partially saponified polyvinyl acetate (containing about 20% acetate groups) is added to 90 parts of water and 90 parts alcohol and stirred until solution was complete. Two parts of the diglycidyl ether of glycerin and 1 part of a commercial solution of fluoroboric acid is added. The solution is spread upon a smooth surface, dried at 20–30° C. The resulting film is removed and cured in an oven for 20 minutes at 170° C. The acetate groups are removed by immersion in a solution of 10 parts sodium hydroxide and 90 parts water. When the saponification is complete, wash the film free of NaOH with water and dry at room temperature.

*Example 6*

Twenty parts of a partially saponified polyvinyl acetate, 90 parts of water and 90 parts of methanol are stirred with warming until the solution is complete. Two parts of the diglycidyl ether of bis (4,4' hydroxy phenyl) methane is added with 1 part of a commercial solution (40%) fluoroboric acid. After drying and curing as in Example 1, the films are water insoluble but swell in acid or alkaline solutions. The acetate groups may be removed as in Example 5 if desired.

It is to be understood that the above detailed description of the present invention is intended to disclose an embodiment thereof to those skilled in the art, but that the invention is not to be construed as limited in its application to the details set forth hereinabove since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. The process of making water insoluble films comprising dissolving partially saponified polyvinyl acetate in a water-alcohol solution, said polyvinyl acetate being saponified to the extent that it is soluble in the water-alcohol solution, adding thereto diglycidyl ether of glycerine and fluoroboric acid, forming the film from the solution, drying the film, curing the film at an elevated temperature, and thereafter removing the acetate from the film by immersion the film in a solution of sodium hydroxide and water.

2. The process of making water insoluble films comprising adding partially saponified polyvinyl acetate to a solution of water and methanol, said polyvinyl acetate being saponified to the extent that it is soluble in the water methanol solution, adding to the solution diglycidyl ether of bis (4,4' hydroxy phenol) methane and fluoroboric acid, forming the film, drying, curing the film, and thereafter removing the acetate from the film by immersing in the solution of sodium hydroxide and water.

3. The process of making water insoluble films comprising adding partially saponified polyvinyl acetate to a solution of water and methanol, said polyvinyl acetate being saponified to the extent that it is soluble in the water methanol solution, adding to the solution diglycidyl ether of bis (4,4' hydroxy phenol) methane and fluoroboric acid, forming the film, drying and curing the film, removing the acetate from the film by immersing in the solution of sodium hydroxide and water, removing the sodium hydroxide from the film by washing and thereafter drying the completed film.

4. The process of making water insoluble films capable of passing ions in aqueous solutions of electrolytes but are impermeable toward electron flow comprising, dissolving a polyvinyl acetate which is partially saponified to the extent that it is soluble in a water-alcohol solution, adding thereto diglycidyl ether of glycerin and a fluoroboric acid catalyst, forming a film from the solution, drying the film, curing the film at elevated temperatures to produce a cross-linked polymer and thereafter removing the acetate groups from the film by immersing the film in a basic aqueous solution such as sodium hydroxide and water.

5. The process of making water insoluble films capable of passing ions in aqueous solutions of electrolytes but are impermeable toward electron flow, comprising, dissolving a polyvinyl acetate which is partially saponified to the extent that it is soluble in a water-alcohol solution, adding thereto diglycidyl ether of bis (4,4' hydroxy phenol) methane and a fluoroboric acid catalyst, forming a film from the solution, drying the film, curing the film at elevated temperatures to produce a cross-linked polymer, and thereafter removing the acetate groups from the film by immersing the film in a basic aqueous solution such as sodium hydroxide and water.

6. A film of polyvinyl alcohol which is insoluble in acidic and basic aqueous solutions of electrolytes, having cross-linking groups between the polymer molecules, formed when a compound of diglycidyl ether of bis (4,4' hydroxy phenol) methane reacts in the presence of a fluoboric acid catalyst with the polymer molecules to form ether-type bonds which are stable toward both acidic and basic aqueous solutions.

7. A film of polyvinyl alcohol which is insoluble in acidic and basic aqueous solutions of electrolytes, having cross-linking groups between the polymer molecules formed when a compound containing digylcidyl ether of glycerine reacts in the presence of a fluoroboric acid catalyst with said polymer molecules to form ether-type bonds which are stable in both acidic and basic aqueous solutions.

8. The process of making water-insoluble films which are permeable to ions in aqueous electrolyte solutions but are impermeable to electronic flow, comprising insolubilizing polyvinyl alcohol by the introduction of cross-linking chains of atoms formed when diglycidyl ether of glycerine reacts with the hydroxyl groups of polyvinyl alcohol in the presence of a fluoroboric acid catalyst, the cross-linking forming stable ether bonds which are stable in both acidic and alkaline electrolytes.

9. The process of making water-insoluble films which are permeable to ions in aqueous electrolyte solutions but are impermeable to electronic flow, comprising insolubilizing polyvinyl alcohol by the introduction of cross-linking chains of atoms formed when a compound of diglycidyl ether of bis (4,4' hydroxy phenol) methane reacts with the hydroxyl groups of polyvinyl alcohol in the presence of a fluoroboric acid catalyst, the cross-linking forming stable ether bonds which are stable in both acidic and alkaline electrolytes.

References Cited by the Examiner

UNITED STATES PATENTS

| | | | |
|---|---|---|---|
| 2,648,717 | 8/1953 | Ross | 136—146.2 |
| 2,844,570 | 7/1958 | Broderick | 260—91.3 |
| 2,844,571 | 7/1958 | Broderick | 260—91.3 |
| 2,941,988 | 6/1960 | Wolf | 260—91.3 |
| 2,990,398 | 6/1961 | Inskip et al. | 260—91.3 |
| 3,052,652 | 9/1962 | Halpern et al. | 260—91.3 |
| 3,099,646 | 7/1963 | Scardiglia et al. | 260—91.3 |
| 3,106,543 | 10/1963 | Milne et al. | 260—91.3 |

FOREIGN PATENTS 805,233   4/1936   France.

JOSEPH L. SCHOFER, *Primary Examiner.*

W. H. SHORT, *Examiner.*